US007553883B2

(12) United States Patent
Yatake

(10) Patent No.: US 7,553,883 B2
(45) Date of Patent: Jun. 30, 2009

(54) AQUEOUS PIGMENT INK COMPOSITION AND METHOD OF MANUFACTURING THE SAME

(75) Inventor: Masahiro Yatake, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 506 days.

(21) Appl. No.: 11/130,431

(22) Filed: May 16, 2005

(65) Prior Publication Data

US 2006/0058420 A1    Mar. 16, 2006

(30) Foreign Application Priority Data

| May 17, 2004 | (JP) | ............................. 2004-146359 |
| May 17, 2004 | (JP) | ............................. 2004-146361 |
| May 12, 2005 | (JP) | ............................. 2005-139715 |

(51) Int. Cl.
*C09D 11/00*    (2006.01)
(52) U.S. Cl. ...................................... 523/160; 523/161
(58) Field of Classification Search ................. 523/160, 523/161
See application file for complete search history.

(56) References Cited

U.S. PATENT DOCUMENTS

| 5,085,698 A | * | 2/1992 | Ma et al. ..................... 524/388 |
| 2004/0020407 A1 | * | 2/2004 | Kato .......................... 106/31.6 |

FOREIGN PATENT DOCUMENTS

| EP | 1 006 161 | 6/2000 |
| JP | 08-302264 | 11/1996 |
| JP | 09-208870 | 8/1997 |
| JP | 10-046077 | 2/1998 |
| JP | 11-012519 | 1/1999 |
| JP | 2000-026779 | 1/2000 |
| JP | 2000-265096 | 9/2000 |
| JP | 2001-240779 | 9/2001 |
| JP | 2004-017569 | 1/2004 |
| WO | 99/06219 | 2/1999 |
| WO | 99/23183 | 5/1999 |
| WO | 99/67337 | 12/1999 |

OTHER PUBLICATIONS

Patent Abstracts of Japan of JP 08-302264 dated Nov. 19, 1996 and English Computer-Generated Translation of Claims and Specification.
Patent Abstracts of Japan of JP 09-208870 dated Aug. 12, 1997 and English Computer-Generated Translation of Claims and Specification.
Patent Abstracts of Japan of JP 10-046077 dated Feb. 17, 1998 and English Computer-Generated Translation of Claims and Specification.
Patent Abstracts of Japan of JP 11-012519 dated Jan. 19, 1999 and English Computer-Generated Translation of Claims and Specification.
Patent Abstracts of Japan of JP 2000-026779 dated Jan. 25, 2000 and English Computer-Generated Translation of Claims and Specification.
Patent Abstracts of Japan of JP 2000-265096 dated Sep. 26, 2000 and English Computer-Generated Translation of Claims and Specification.
Patent Abstracts of Japan of JP 2001-240779 dated Sep. 4, 2001 and English Computer-Generated Translation of Claims and Specification.
Patent Abstracts of Japan of JP 2004-017569 dated Jan. 22, 2004 and English Computer-Generated Translation of Claims and Specification.

* cited by examiner

*Primary Examiner*—Edward J Cain
(74) *Attorney, Agent, or Firm*—Ladas and Parry LLP

(57) ABSTRACT

The invention provides an aqueous pigment ink composition that ensures excellent recording characteristics on any type of recording mediums. An aqueous pigment ink composition of the invention includes a pigment, a water-dispersible polymer, water, and a water-soluble organic solvent, where the pigment is dispersed as primary particles having an average primary particle diameter of not greater than 50 nm and as secondary particles having a ratio of an average secondary particle diameter to the average primary particle diameter in a range of 1 to 10, and the water-dispersible polymer has a minimum glass transition temperature of lower than 100° C. Using this polymer ensures good dispersion stability and favorable glossiness on a glossy medium.

24 Claims, No Drawings

AQUEOUS PIGMENT INK COMPOSITION AND METHOD OF MANUFACTURING THE SAME

BACKGROUND OF THE INVENTION

1. Technical Field

The present invention relates to an aqueous ink composition, a method of manufacturing the same, an inkjet recording method and a recording matter.

2. Description of the Prior Art

Aqueous pigment ink compositions have widely been used, since the pigment ink has high light fastness and high water resistance and gives the excellent image fastness to resulting recorded matters. Styrene-acrylate copolymers are generally used for dispersion of the pigment in an aqueous medium. The pigment is coated with such a polymer and is dispersed in the form of polymer-coated pigment to ensure the sufficient water dispersibility and the enhanced color development. The aqueous pigment ink composition is demanded to attain the high optical density on plain paper and the enhanced glossiness on glossy paper for the improved recording characteristics. A technique disclosed in Japanese Patent Laid-Open Gazette No. 2004-17569 enhances the cohesive property of the pigment inkjet-recorded on plain paper for the heightened optical density on the plain paper. An ink composition disclosed in Japanese Patent Laid-Open Gazette No. H09-208870 includes an emulsion to improve the glossiness on glossy paper.

SUMMARY OF THE INVENTION

These prior art techniques, however, dot not ensure the sufficient recording quality on both a glossy medium, such as glossy paper, and on a non-glossy medium, such as plain paper. An object of the invention is thus to provide an aqueous pigment ink composition that ensures excellent recording characteristics on both a glossy medium and a non-glossy medium. An object of the invention is also to provide a manufacturing method of such an aqueous pigment ink composition. An object of the invention is further to provide a water-dispersible polymer and a pigment dispersion suitable for preparation of such an aqueous pigment ink composition. An object of the invention is also to provide an inkjet recording method with such an aqueous pigment ink composition, as well as to a resulting inkjet recorded matter.

The inventors of the present invention have noted the particle diameter of the pigment, specifically the primary particle diameter of the pigment, included in the aqueous pigment ink composition and have found that adequate control of the primary particle diameter and of the relation between the primary particle diameter and the secondary particle diameter ensures images of good recording quality regardless of the type of the selected recording medium while giving images of excellent recording quality according to the type of the selected recording medium. The inventors have also examined the water-dispersible polymer of the aqueous pigment ink composition to disperse the pigment in the aqueous medium and have focused attention on the hydrophilic group in the polymer that contributes the water dispersibility, as well as on the polymerization site of the hydrophilic group. The inventors have then found that the localized presence of the hydrophilic group in the polymer attains the good water dispersibility of the pigment and ensures images of good recording quality regardless of the type of the selected recording medium while giving images of excellent recording quality according to the type of the selected recording medium. Based on these findings, the technique of the invention is arranged as discussed below.

The present invention is directed to a first aqueous pigment ink composition which includes: a pigment; a water-dispersible polymer; water; and a water-soluble organic solvent, wherein the pigment is dispersed as primary particles having an average primary particle diameter of not greater than 50 nm and as secondary particles having a ratio of an average secondary particle diameter to the average primary particle diameter in a range of 1 to 10, and the water-dispersible polymer has a minimum glass transition temperature of lower than 100° C. In the first ink composition of the invention, the ratio of the average secondary particle diameter to the average primary particle diameter is preferably not greater than 3. The average secondary particle diameter of the pigment is preferably not greater than 200 nm, more preferably not greater than 100 nm. The minimum glass transition temperature of the water-dispersible polymer is preferably not higher than 25° C. In the first ink composition of the invention, the water-dispersible polymer is preferably an acrylate-acrylic acid copolymer. The pigment is preferably coated with the water-dispersible polymer and is dispersed in the form of polymer-coated pigment. The ink composition preferably contains the water-dispersible polymer in a range of 20 parts by weight to 200 parts by weight relative to 100 parts by weight of the pigment. The ink composition of the invention preferably further contains either or both of (a) and (b): (a) at least one of dialkyleneglycol monobutyl ethers and trialkyleneglycol monobutyl ethers, where the alkylene group contains 2 to 3 carbon atoms; and (b) at leas one of 1,2-alkanediols, where the alkane contains 5 to 8 carbon atoms.

The first ink composition described above is preferably used as inkjet recording ink In one structure of the first ink composition of the invention described above, the water-dispersible polymer may be a copolymer having at least a hydrophilic group, which is mostly localized at a polymer end. In this structure, the water-dispersible polymer preferably has a monomer unit, which includes selected one of aromatic groups, cyclic aliphatic hydrocarbon groups of and over 5 carbon atoms, and chain aliphatic hydrocarbon groups of and over 8 carbon atoms, in a residual site other than the polymer end having the localized hydrophilic group. In this structure, the water-dispersible polymer is preferably a copolymer prepared by copolymerization of a hydrophilic group-containing monomer with a prepolymer mainly composed of a monomer other than the hydrophilic group-containing monomer. Here, the hydrophilic group-containing monomer to be copolymerized with the prepolymer is not less than 80 mole percent of a total content of the hydrophilic group-containing monomer in the water-dispersible polymer. In this structure, the hydrophilic group is preferably carboxyl group. The water-dispersible polymer is preferably (meth)acrylate-(meth)acrylic acid copolymer.

The present invention is also directed to a pigment dispersion for an aqueous pigment ink composition, having an aqueous phase, in which a water-dispersible polymer disperses a pigment as primary particles having an average primary particle diameter of not greater than 50 nm and as secondary particles having a ratio of an average secondary particle diameter to the average primary particle diameter in a range of 1 to 10. The present invention is further directed to a manufacturing method of an aqueous pigment ink composition which includes: a pigment dispersion step of preparing a pigment dispersion having an aqueous phase, in which a water-dispersible polymer disperses a pigment as primary particles having an average primary particle diameter of not greater than 50 nm and as secondary particles having a ratio of an average secondary particle diameter to the average primary particle diameter in a range of 1 to 10; and a composition preparation step of preparing the aqueous pigment ink composition from the pigment dispersion prepared in the pigment dispersion step. In the pigment dispersion of the invention and the pigment dispersion used in the manufacturing method of an aqueous pigment ink composition, the water-dispersible polymer may be a copolymer having at least a hydrophilic group, which is mostly localized at a polymer end.

The present invention is further directed to a second ink composition which includes: a pigment; a water-dispersible polymer; water; and a water-soluble organic solvent, wherein the water-dispersible polymer is a copolymer having at least a hydrophilic group, which is mostly localized at a polymer end. In the second ink composition of the invention, the water-dispersible polymer preferably has a monomer unit, which includes selected one of aromatic groups, cyclic aliphatic hydrocarbon groups of and over 5 carbon atoms, and chain aliphatic hydrocarbon groups of and over 8 carbon atoms, in a residual site other than the polymer end having the localized hydrophilic group. The water-dispersible polymer is preferably a copolymer prepared by copolymerization of a hydrophilic group-containing monomer with a prepolymer mainly composed of a monomer other than the hydrophilic group-containing monomer. Here, the hydrophilic group-containing monomer to be copolymerized with the prepolymer is preferably not less than 80 mole percent of a total content of the hydrophilic group-containing monomer in the water-dispersible polymer. In the second ink composition of the invention, the hydrophilic group is preferably carboxyl group. The water-dispersible polymer is preferably (meth)acrylate-(meth)acrylic acid copolymer. In the second ink composition of the invention, the pigment is preferably coated with the water-dispersible polymer and is dispersed in the form of polymer-coated pigment. The second ink composition preferably further contains either or both of (a) and (b): (a) at least one of dialkyleneglycol monobutyl ethers and trialkyleneglycol monobutyl ethers, where the alkylene group contains 2 to 3 carbon atoms; and (b) at leas one of 1,2-alkanediols, where the alkane contains 5 to 7 carbon atoms.

The second ink composition described above is preferably used as inkjet recording ink The present invention is further directed to a polymer for an aqueous pigment dispersion, having at least a hydrophilic group, which is mostly localized at a polymer end. The present invention is still further directed to a manufacturing method of a polymer for an aqueous pigment dispersion, including the steps of preparing a prepolymer mainly composed of a monomer other than a hydrophilic group-containing monomer; and copolymerizing the hydrophilic group-containing monomer with the prepolymer to give a copolymer having a hydrophilic group mostly localized at a polymer end. The present invention is still further directed to a manufacturing method of an aqueous pigment ink composition, including: a pigment dispersion step of preparing a pigment dispersion having an aqueous phase, in which a water-dispersible polymer disperses a pigment as primary particles having an average primary particle diameter of not greater than 50 nm and as secondary particles having a ratio of an average secondary particle diameter to the average primary particle diameter in a range of 1 to 10; and a composition preparation step of preparing the aqueous pigment ink composition from the pigment dispersion prepared in the pigment dispersion step.

The present invention is also actualized as an inkjet recording method including the step of ejecting the aqueous pigment ink composition described above onto surface of a recording medium to form an inkjet recorded image. The invention is also actualized as a recorded matter with an inkjet recorded image that is formed with the aqueous pigment ink composition described above on surface of a recording medium.

DESCRIPTION OF THE PREFERRED EMBODIMENTS

The invention is directed to an aqueous pigment ink composition, which contains a pigment, a water-dispersible polymer, water, and an organic solvent, where the pigment is dispersed as primary particles having an average primary particle diameter of not greater than 50 nm and as secondary particles having a ratio of an average secondary particle diameter to the average primary particle diameter in a range of 1 to 10, and the water-dispersible polymer has a minimum glass transition temperature of lower than 100° C. (Hereafter this ink composition is referred to as the pigment particle diameter-controlled ink composition). The pigment dispersion of the primary particles having the average primary particle diameter of not greater than 50 nm gives favorable glossiness to a glossy medium, such as glossy paper. The pigment dispersion of the secondary particles having the ratio of the average secondary particle diameter to the average first particle diameter in the range of 1 to 10 gives a favorable optical density to a non-glossy medium, such as plain paper. This ink composition of the invention thus desirably ensures images of good recording quality on both the glossy medium and the non-glossy medium, while giving images of excellent recording quality according to the type of the selected recording medium.

The invention is also directed to an aqueous pigment ink composition, which contains a pigment, a water-dispersible polymer, water, and a water-soluble organic solvent, where the water-dispersible polymer is a copolymer having at least a hydrophilic group mostly localized at a polymer end (hereafter this ink composition is referred to as the hydrophilic group-localized polymer-containing ink composition). Application of such a copolymer to the water-dispersible polymer for dispersion of the pigment attains the favorable water dispersibility of the pigment and gives a high optical density to a non-glossy medium, such as plain paper, while giving high glossiness to a glossy medium, such as glossy paper. Localization of the hydrophilic group, though not restrictive, ensures the efficient appearance of the hydrophilic group in the surface layer of the pigment dispersion to stabilize the dispersion and reduce the relative amount of the hydrophilic group for the improved optical density (color development). This arrangement decreases the absolute amount of a hydrophilic group-containing monomer, for example, a carboxyl group-containing monomer, and thereby increases the amount of the monomer with a high refractive index to enhance the glossiness. This ink composition of the invention thus desirably ensures images of good recording quality on both the glossy medium and the non-glossy medium, while giving images of excellent recording quality according to the type of the selected recording medium.

The description given below regards the aqueous pigment ink composition (hereafter simply referred to as the ink composition) of the present invention, the water-dispersible polymer and its manufacturing method, the pigment dispersion and its manufacturing method, the manufacturing method of the ink composition, the inkjet recording method with the ink composition, and the resulting inkjet recorded matter. In the description below, the terminology 'ink composition' includes both the hydrophilic group-localized polymer-containing ink composition and the pigment particle diameter-controlled ink composition. The ink composition of the invention may be constructed as the hydrophilic group-localized polymer-containing ink composition or may alternatively be constructed as the pigment particle diameter-controlled ink composition. The ink composition of the invention may otherwise have the characteristics of both the hydrophilic group-localized polymer-containing ink composition and the pigment particle diameter-controlled ink composition. Namely the ink composition may have the controlled average primary particle diameter and average secondary particle diameter of the pigment and contain the polymer having the localized hydrophilic group. The controlled average particle diameter of the pigment is compatible with the presence of the polymer having the localized hydrophilic group in one identical ink composition. These characteristics exert the respective functions and effects in the individual ink compositions.

In the specification hereof, the terminology '(meth)acryl' includes both 'acryl' and 'methacryl', and the terminology '(meth)acrylate' includes both 'acrylate' and 'methacrylate'. In the specification, '%' and 'parts' respectively represent 'percent by weight' and 'parts by weight', unless otherwise specified.

(Pigment)

An inorganic pigment or an organic pigment may be used as the pigment. As an inorganic pigment, titanium oxide, iron oxide, etc., may be used. Examples of organic pigments that may be used include azo pigments (including azo lakes, insoluble azo pigments, condensed azo pigments, chelated azo pigments, etc.), polycyclic pigments (including phthalocyanine pigments, perylene pigments, perinone pigments, anthraquinone pigments, quinacridone pigments, dioxan pigments, thioindigo pigments, isoindolinone pigments, quinophthalone pigments, etc.), nitro pigments, nitroso pigments, aniline black, etc.

Examples of pigments for black ink include carbon blacks (C. I. Pigment Black 7), such as furnace black, lamp black, acetylene black, channel black, etc., metals, such as copper oxides, iron oxides (C. I. Pigment Black 11), titanium oxide, etc., and organic pigments, such as aniline black (C. I. Pigment Black 1), etc. A carbon black, which is comparatively low in specific density and does not settle readily in water, is preferable for ink jet printing.

Furthermore, for color inks, C. I. Pigment Yellow 1 (Fast Yellow G), 3, 12 (Dis-Azo Yellow AAA), 13, 14, 17, 24, 34, 35, 37, 42 (Yellow Iron Oxide), 53, 55, 74, 81, 83 (Dis-Azo Yellow HR), 93, 94, 95, 97, 98, 100, 101, 104, 108, 109, 110, 117, 120, 128, 138, 153, and 180, C. I. Pigment Red 1, 2, 3, 5, 17, 22 (Brilliant Fast Scarlet), 23, 31, 38, 48:1 (Permanent Red 2B (Ba)), 48:1 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 101 (Red Iron Oxide), 104, 105, 106, 108 (Cadmium Red), 112, 114, 122 (Quinacridone Magenta), 123, 146, 149, 166, 168, 170, 172, 177, 178, 179, 185, 190, 193, 202, 209, and 219, C. I. Pigment Violet 19, C. I. Pigment Blue 1, 2, 15 (Phthalocyanine Blue R), 15:1, 15:2, 15:3 (Phthalocyanine Blue G), 15:4, 15:6 (Phthalocyanine Blue E), 16, 17:1, 56, 60, and 63, and C. I. Pigment Green 1, 4, 7, 8, 10, 17, 18, and 36, etc., may be used. However, the pigments are not limited to the above. The content of the pigment in the ink composition is preferably no less than 0.5% and no more than 30%, more preferably in the range of no less than 1.0%, and even more preferably in the range of no less than 2%. Yet even more preferably, the content is no less than 3% and more preferably no less than 4%. The upper limit is more preferably no more than 12% and even more preferably no more than 8%. With the present ink composition, the preferable form of the pigment is a polymer-coated pigment. The polymer-coated pigment shall be described later.

The pigment particles included in the ink composition preferably have an average particle diameter of not greater than 200 nm, preferably of not greater than 150 nm, or more preferably of not greater than 100 nm. The average particle diameter of greater than 200 nm significantly lowers the water dispersibility.

The average particle diameter of the pigment is measurable by, for example, the light scattering method or the capillary hydrodynamic fractionation (CHDF) method. The light scattering method uses a light source, for example, laser to measure a particle size distribution with a particle size distribution analyzer and computes the average particle diameter. For example, Zetasizer 3000HS (manufactured by Malvern Instruments Ltd., the UK) may be applied for measurement of the average secondary particle diameter by the light scattering method. The CHDF method classifies the particles by the size in a capillarity and computes the amount of the classified particles from the measured absorbance. The CHDF method may use, for example, a capillary particle size distribution analyzer (CHDF-2000 manufactured by Matec Applied Sciences, the USA).

In the pigment particle diameter-controlled ink composition, it is preferable that at least part of the pigment is dispersed in the form of primary particles in an aqueous medium. The (number-based) average primary particle diameter of the pigment included in the ink composition of the invention is preferably not greater than 50 nm. The average primary particle diameter of not greater than 50 nm ensures formation of a highly flat pigment layer that effectively prevents diffused reflection of light on a glossy medium, such as glossy paper, thus enabling formation of an image with excellent glossiness. The average primary particle diameter of greater than 50 nm, on the other hand, significantly lowers the flatness of an image and thereby the glossiness. The preferable average primary particle diameter of the pigment is not less than 10 nm. The average primary particle diameter of less than 10 nm heightens the cohesive property of the particles and increases the secondary particle diameter to an unnecessarily large level.

In one preferable arrangement of the pigment particle diameter-controlled ink composition, the primary particles of the pigment have the average primary particle diameter of not greater than 50 nm, and at least 90% of the primary particles of the pigment are included in a particle diameter range of ±20% around the average primary particle diameter. This particle diameter distribution of the primary particles of the pigment ensures the favorable glossiness on the glossy medium and the sufficient dispersion stability. More preferably, at least 95% of the primary particles of the pigment are included in this particle diameter range. In the specification hereof, the terminology 'average particle diameter', 'average primary particle diameter', and 'average secondary particle diameter' are all computed on the basis of the number of the relevant particles.

In the pigment particle diameter-controlled ink composition, the average primary particle diameter of the pigment may be computed from the observation result of a particle size distribution by microscopy, for example, transmission electron microscopy. The particle size distribution may be obtained by image processing and statistical processing of an observed image by transmission electron microscopy. One concrete procedure adequately dilutes an aqueous pigment ink composition (including a pigment dispersion), soaks a copper mesh for observation by transmission electron microscopy in the diluted pigment dispersion, and vacuum-dries the soaked copper mesh in low vacuum to give a test sample. The procedure measures the test sample by transmission electron microscopy, for example, FE-TEM (field emission transmission electron microcopy, CM200FEG manufactured by Royal Philips Electronics, the Netherlands: accelerating voltage 120 kV), extracts at random the primary particles of the pigment of or over a preset quantity, for example, 100 or more primary particles, from a microscopic image of the test sample, and computes the average primary particle diameter by image processing and statistical processing.

In the pigment particle diameter-controlled ink composition, is preferable that the pigment is dispersed as secondary particles having the ratio of the average secondary particle diameter to the average primary particle diameter (average secondary particle diameter/average primary particle diameter) in a range of 1 to 10. Namely the average secondary particle diameter of the secondary particles is preferably not less than 1-fold and not greater than 10-fold the average primary particle diameter. The ratio of '1' means that the pigment is present as only the primary particles. The ratio of not greater than 10 keeps the average secondary particle diameter of the pigment dispersed as secondary particles at the adequate level relative to the primary particle diameter and ensures the sufficient dispersion stability and glossiness on the glossy medium. Specifically the preferable ratio is not greater than 3. The ratio of not greater than 3 ensures the good dispersion stability and glossiness on the glossy medium. More specifically the preferable ratio is not greater than 2. The ratio of not greater than 2 ensures both the high optical density of an image on the non-glossy medium and the high glossiness on the glossy medium. In the specification hereof, the terminology 'primary particles' and 'secondary particles' respectively mean the discrete, single particles and the particles formed by aggregation or cohesion of two or more primary particles.

In the pigment particle diameter-controlled ink composition, it is preferable that the pigment has the average secondary particle diameter of not greater than 200 nm. The average secondary particle diameter of greater than 200 nm significantly lowers the glossiness on the glossy medium. The average secondary particle diameter is specifically not greater than 100 nm or more specifically not greater than 90 nm. The average secondary particle diameter may be measurable by the light scattering method. The procedure of the light scattering method uses a light source, for example, laser to measure a particle size distribution with a particle size distribution analyzer and computes the average secondary particle diameter. For example, Zetasizer 3000HS (manufactured by Malvern Instruments Ltd., the UK) may be applied for measurement of the average secondary particle diameter by the light scattering method, as mentioned previously. Another technique having the accuracy and precision equivalent to or higher than those of the light scattering method, for example, capillary hydrodynamic fractionation (CHDF) method, may be adopted for the same purpose. The CHDF method may use, for example, the capillary particle size distribution analyzer (CHDF-2000 manufactured by Matec Applied Sciences, the USA).

In a preferable arrangement of the pigment particle diameter-controlled ink composition, at least 95% or more specifically at least 99% of the secondary particles of the pigment (on the number basis) are included in a particle diameter range of ±20% around the average secondary particle diameter. The secondary particles of the pigment in this particle size distribution ensure the good dispersion stability and the favorable glossiness on the glossy medium.

(Water-Dispersible Polymer)

The water-dispersible polymer used in the ink composition of the invention is described in detail.

The water-dispersible polymer used for the ink composition is any one or plurality of various known polymers including polyacrylates, styrene-acrylate copolymers, polystyrenes, polyesters, polyamides, polyimides, silicon-containing polymers, and sulfur-containing polymers. This water-dispersible polymer enhances the fixation property. For the favorable fixation and color development properties, the water-dispersible polymer preferably has any of acryloyl group, methacryloyl group, ethyleneoxy group, propyleneoxy group, hydroxyl group, amino group, amide group, furan group, thiophene group, pyrrolidone group, imidazole group, imidazolidinone group, lactone group, lactam group, carbonate group, epoxy group, urethane group, urea group, allophanate group, biuret group, and isocyanurate group.

The water-dispersible polymer may be made of a monomer or an oligomer with double-bond acryloyl group, methacryloyl group, vinyl group, or aryl group. Available are various monofunctional monomers including styrene, (α-, 2-, 3-, and 4-)alkylstyrenes, (α-, 2-, 3-, and 4-)alkoxystyrenes, 3,4-dimethylstyrene, α-phenylstyrene, divinylbenzene, vinylnathalene, methyl(meth)acrylate, ethyl(meth)acrylate, propyl (meth)acrylate, butyl (meth)acrylate, ethylhexyl(meth) acrylate, hexyl(meth)acrylate, cyclohexyl (meth)acrylate, octyl(meth)acrylate, lauryl(meth)acrylate, 2-ethylhexyl (meth)acrylate, and other alkyl(meth)acrylates, methoxy diethyleneglycol (meth)acrylate, ethoxy, propoxy, butoxy, phenoxy, and para-cumylphenoxy-diethyleneglycol and polyethyleneglycol (meth)acrylates, cyclohexyl (meth)acrylate, benzyl(meth)acrylate, phenoxyethyl(meth)acrylate, isobornyl(meth)acrylate, hydroxyalkyl(meth)acrylates, dimethylamino (meth)acrylate, dimethylaminoethyl(meth)acrylate, dimethylaminopropylacrylamide, N,N-dimethylaminoethyl acrylate, acryloyl morpholine, N,N-dimethylacrylamide, N-isopropylacrylamide, N,N-diethylacrylamide, fluorine-containing, chlorine-containing, and sulfur-containing (meth)acrylates, silicon-containing (meth)acrylates, (meth)acrylamide, amide maleate, and (meth)acrylic acids. For introduction of the crosslinking structure, compounds with acryloyl group or methacryloyl group are usable, for example, (mono, di, tri, tetra, and poly) ethylene glycol (meth)acrylates, 1,4-butanediol, 1,5-pentanediol, 1,6-hexanediol, 1,8-octanediol, and 1,10-decanediol (meth)acrylates, trimethyrolpropane tri(meth) acrylate, glycerol di(meth)acrylate, glycerol tri(meth) acrylate, ethylene oxide-added bisphenol A and bisphenol F di(meth)acrylates, neopentylglycol di(meth)acrylate, pentaerythritol tetra(meth)acrylate, dipentaerythritol hexa(meth) acrylate.

(Water-Dispersible Polymer in Hydrophilic Group-Localized Ink Composition)

The water-dispersible polymer included in the hydrophilic group-localized ink composition (hereafter referred to as the hydrophilic group-localized polymer) may include any of hydrophilic groups and hydrophilic group-containing monomers given below.

(Hydrophilic Group and Hydrophilic Group-Containing Monomer)

The hydrophilic group to be included in the hydrophilic group-localized polymer for addition of the hydrophilic property is, for example, hydroxyl group, carboxyl group, sulfonate group, or phosphate group. Typical examples of the hydroxyl group-containing monomer applicable to the hydrophilic group-localized polymer include 2-hydroxylethyl (meth)acrylate, 2-(2-hydroxylethoxy)ethyl(meth)acrylate, 2-hydroxypropyl(meth)acrylate, diethyleneglycol (meth) acrylate, ethyl(2-hydroxymethyl)-2-propanoate, and 2,3-dihydroxypropyl (meth)acrylate. Typical examples of the carboxyl group-containing monomer applicable to the hydrophilic group-localized polymer include acrylic acid, methacrylic acid, crotonic acid, propyl(meth)acrylic acids, isopropyl(meth)acrylic acids, itaconic acid, and fumaric acid. Other available examples include ω-carboxypolycaprolactone mono(meth)acrylate, monohydroxyethyl(meth)acrylate phthalate, and (meth)acrylic acid dimmers. The hydrophilic group-localized polymer may include any one or any combination of these examples. Especially preferable is either or both of acrylic acid and methacrylic acid.

The content of the hydrophilic group-containing monomer is preferably not less than 4%, specifically not less than 5%, or more specifically not less than 6% of the total monomer weight of the water-dispersible polymer. The content of less than 4% may not give the sufficient water dispersibility.

It is preferable that the hydrophilic group is mostly localized at a polymer end of the hydrophilic group-localized polymer. Localization of the hydrophilic group ensures the efficient appearance of the hydrophilic group in the surface layer of the pigment dispersion to stabilize the dispersion and reduce the relative amount of the hydrophilic group for the improved optical density (color development). This arrangement decreases the absolute amount of the carboxyl group-containing monomer and thereby increases the amount of the monomer with a high refractive index to enhance the glossiness. The polymer end represents either or both of the two ends of the polymer chain. When the water-dispersible polymer is prepared by copolymerization of the hydrophilic group-containing monomer with a prepolymer synthesized mainly from a monomer other than the hydrophilic group-containing monomer, the hydrophilic group-containing monomer chain added to the prepolymer corresponds to the polymer end.

The localization rate of the hydrophilic group-containing monomer present at the polymer end is preferably not less than 70 mole percent, specifically not less than 80 mole percent, or more specifically not less than 85 mole percent of the whole content of the hydrophilic group-containing monomer in the hydrophilic group-localized polymer. The localization rate of less than 70 mole percent does not ensure the sufficient localization effects of the hydrophilic group. The localization rate of not less than 80 mole percent effectively enhances the optical density on plain paper and the glossiness on glossy paper. The polymer end having the localized hydrophilic group may include a monomer unit other than the hydrophilic group-containing monomer in a certain range that does not damage these effects.

(Hydrophobic Group-Containing Monomer)

The hydrophilic group-localized polymer preferably has a hydrophobic group, more specifically a hydrophobic and bulky group in a residual site other than the polymer end (non-polymer-end site). Namely the water-dispersible polymer of the invention has a monomer unit with the hydrophobic group in the non-polymer-end site. When the hydrophilic group is localized at only one polymer end of the water-dispersible polymer, the non-polymer-end site represents the whole residual site including the other end of the polymer. When the hydrophilic group is localized at both polymer ends of the water-dispersible polymer, on the other hand, the non-polymer-end site represents the residual site located between the two ends of the polymer. The terminology 'hydrophobic group' in the specification hereof represents a group having the higher hydrophobic tendency than the hydrophilic group included in the water-dispersible polymer of the invention.

The hydrophobic group may be any of aromatic groups, cyclic aliphatic hydrocarbon groups of and over 5 carbon atoms, and chain aliphatic hydrocarbon groups of and over 8 carbon atoms. Typical examples of the aromatic group are substituted and non-substituted benzyl groups. Typical examples of the cyclic aliphatic hydrocarbon group are substituted and non-substituted cycloalkyl groups, such as cyclopentyl group, cyclohexyl group, and cycloheptyl group. Typical examples of the chain aliphatic hydrocarbon group are alkyl groups, such as ethylhexyl group, octyl group, nonyl group, decyl group, undecyl group, and dodecyl group.

Available examples of the hydrophobic, aromatic group-containing monomer include styrene, benzyl(meth)acrylate, para-cumylphenoxyethyleneglycol (meth)acrylate, and phenol EO-modified acrylate. Available examples of the hydrophobic, cyclic aliphatic hydrocarbon group-containing monomer include cyclopentyl(meth)acrylate, cyclohexyl (meth)acrylate, cycloheptyl(meth)acrylate, and isobornyl (meth)acrylate. Available examples of the hydrophobic, chain aliphatic hydrocarbon group-containing monomer include octyl(meth)acrylate, decyl (meth)acrylate, dodecyl(meth) acrylate, ethylhexyl(meth)acrylate, ethyl (meth)acrylate, butyl(meth)acrylate, as well as urethane-modified (meth) acrylate and epoxy-modified (meth)acrylate. It is desirable that the hydrophobic group-containing monomer does not have hydroxyl group or carboxyl group.

An especially preferable example of the hydrophobic group-containing monomer is para-cumylphenoxyethyleneglycol acrylate. Inclusion of para-cumylphenoxyethyleneglycol acrylate heightens the refractive index of the polymer, while not increasing the glass transition temperature. This enhances the fixation property and the glossiness on glossy paper. The content of para-cumylphenoxyethyleneglycol acrylate is preferably not less than 50%, specifically not less than 70%, more specifically not less than 80%, or most specifically not less than 85% of the total monomer weight of the water-dispersible polymer.

The non-polymer-end site of the hydrophilic group-localized polymer preferably has a polymer chain of one or a combination of these hydrophobic group-containing monomers. The content of the hydrophobic group-containing monomer is preferably not less than 85%, specifically not less than 90%, or more specifically not less than 95% of the total monomer weight of the non-polymer-end site. The content of the hydrophobic group-containing monomer is preferably not less than 80%, specifically not less than 85%, or more specifically not less than 90% of the total monomer weight of the water-dispersible polymer. The non-polymer-end site of the water-dispersible polymer may further include a chain aliphatic hydrocarbon group-containing monomer of not greater than 7 carbon atoms, for example, butyl(meth)acrylate, or some hydrophilic group-containing monomer, in addition to the hydrophobic group-containing monomer, The hydrophilic group-localized polymer is preferably a copolymer having a specific monomer composition where the total content of acrylates and acrylic acid to the total monomer weight is not less than 80%, specifically not less than 90%, or more specifically equal to 100%. The content of less than 80% does not ensure the sufficient fixation property or the sufficient glossiness on glossy paper and other specific papers. Commercially available acrylates, for example, methyl acrylate, ethyl acrylate, propyl acrylate, butyl acrylate, hexyl acrylate, 2-ethylhexylcarbitol acrylate, N-vinylpyrrolidone, isobornyl acrylate, and 2-hydroxyethyl-3-phenoxypropyl acrylate, are also usable in addition to the above examples the hydrophilic group-containing monomer and the hydrophobic group-containing monomer.

The hydrophilic group-localized polymer having para-cumylphenoxyethyleneglycol acrylate as the hydrophobic group-containing monomer is preferably a copolymer, where the total content of para-cumylphenoxyethyleneglycol acrylate, other acrylates, and acrylic acid to the total monomer weight is not less than 80%, specifically not less than 90%, or more specifically equal to 100%. Other acrylates may be any one or any combination of the various acrylates listed above, but preferably include either or both of benzyl acrylate and butyl acrylate.

(Water-Dispersible Polymer in Pigment Particle Size-Controlled Ink Composition)

The following description regards the water-dispersible polymer included in the ink composition having the controlled primary particle diameter and the controlled secondary particle diameter of the pigment. The water-dispersible polymer in the pigment particle size-controlled ink composition is preferably a copolymer having a specific monomer composition where the total content of acrylates and acrylic acid to the total monomer weight is not less than 80%, specifically not less than 90%, or more specifically equal to 100%. The content of less than 80% does not ensure the sufficient fixation property or the sufficient glossiness on glossy paper and other specific papers. The acrylate used for this water-dispersible polymer may be any one or any combination of commercially available acrylates, for example, methyl acrylate, ethyl acrylate, propyl acrylate, butyl acrylate, hexyl acrylate, cyclohexyl acrylate, octyl acrylate, lauryl acrylate, 2-ethylhexyl acrylate, 2-ethylhexylcarbitol acrylate, EO-modified phenol acrylate, N-vinylpyrrolidone, isobornyl acrylate, benzyl acrylate, para-cumylphenoxyethyleneglycol acrylate, EO-modified para-cumylphenol acrylate, and 2-hydroxyethyl-3-phenoxypropyl acrylate. Especially preferable is either or both of benzyl acrylate and butyl acrylate.

An especially preferable example of the water-dispersible polymer in the pigment particle size-controlled ink composition is a copolymer having para-cumylphenoxyethyleneglycol acrylate as a monomer. Inclusion of para-cumylphenoxyethyleneglycol acrylate heightens the refractive index of the polymer, while not increasing the glass transition temperature. This enhances the fixation property and the glossiness on glossy paper. The content of para-cumylphenoxyethyleneglycol acrylate is preferably not less than 50%, specifically not less than 70%, or more specifically not less than 80% of the total monomer weight of the water-dispersible polymer.

The water-dispersible polymer having para-cumylphenoxyethyleneglycol acrylate as the monomer is preferably a copolymer, where the total content of para-cumylphenoxyethyleneglycol acrylate, other acrylates, and acrylic acid to the total monomer weight is not less than 80%, specifically not less than 90%, or more specifically equal to 100%. Other acrylates may be any one or any combination of the various acrylates listed above, but preferably include either or both of benzyl acrylate and butyl acrylate.

The glass transition temperature Tg of the water-dispersible polymer in the pigment particle size-controlled ink composition (the minimum glass transition temperature when the polymer has plural glass transition temperatures) is preferably lower than 100° C., specifically not higher than 40° C., or more specifically not higher than 25° C. The glass transition temperature of not lower than 100° C. does not ensure the sufficient glossiness on glossy media.

The glass transition temperature Tg of the water-dispersible polymer represents a substantially middle point in a temperature range of glass transition and may be measured by, for example, differential scanning calorimetry (DSC), differential thermal analysis (DTA), thermogravimetry (TG), or thermomechanical analysis (TMA). One preferable procedure measures the glass transition temperature by DSC at a temperature rising rate of 10° C./minute in conformity with ISO 11357-1 (1997 Plastics/Differential Scanning Calorimetry (DSC)/Part 1: General Principles). Another technique having the accuracy and precision equivalent to those of DSC is also applicable to measure the glass transition temperature.

The water-dispersible polymer included in the ink composition of the invention preferably has a styrene-converted number average molecular weight in a range of 5,000 to 200,000 by gel permeation chromatography (GPC). The molecular weight of lower than 5,000 may cause the water-dispersible polymer to be released from the ink composition according to the characteristics of the additive or the vehicle of the ink composition and have adverse effects. The water-dispersible polymer may be released from any one or mixture of additives added for the improved printing quality, for example, acetylene glycol surfactants, acetylene alcohol surfactants, and silicone surfactants, diethyleneglycol monobutyl ether, triethyleneglycol monobutyl ether, dipropyleneglycol monobutyl ether, and 1,2-alkyleneglycol monobutyl ether, to damage an adhesive used in a print head. The molecular weight of over 200,000, on the other hand, increases the viscosity of the ink composition and does not ensure the stable dispersion. The preferable range of the molecular weight is not lower than 10,000 or specifically not lower than 20,000 and is not higher than 100,000.

The pigment dispersion of the water-dispersible polymer in the ink composition of the invention is prepared by mixing a pigment, water, and a water-soluble organic solvent with an adequate dispersing device, for example, a ball mill, a sand mill, an Atriter, a roll mill, an agitator, a Henschel mixer, a colloid mill, an ultrasonic homogenizer, a jet mill, or an Ong mill.

(Manufacturing Method of Water-Dispersible Polymer)

The water-soluble polymer included in the ink composition of the invention is obtained by any of known polymerization techniques, for example, solution polymerization or emulsion polymerization. A polymerization initiator used in this invention may be any of general initiators for radical polymerization, for example, potassium persulfate, ammonium persulfate, persulfic acid, azobisisobutyronitrile, azobisisovaleronitrile, azobisacetoxyphenylethane, azobismethylbutaneamide dihydrochloride tetrahydrate, azobismethylbutyronitrile, azobiscyclohexane carbonitrile, dimethyl azobisisobutyrate, azobiscyanovaleric acid, benzoyl peroxide, dibutyl peroxide, peracetic acid, cumene hydroperoxide, t-butyl hydroxyperoxide, and paramenthane hydroxyperoxide.

In the process of polymerization, a chain transfer agent may be added according to need. Examples of chain transfer agents include mercaptans, such as octyl mercaptan, n-dodecyl mercaptan, t-dodecyl mercaptan, n-hexadecyl mercaptan, n-tetradecyl mercaptan, t-tetradecyl mercaptan, etc.; xanthogen disulfides, such as dimethyl xanthogen disulfide, diethyl xanthogen disulfide, diisopropyl xanthogen disulfide, etc.; thiuram disulfides, such as tetramethyl thiuram disulfide, tetraethyl thiuram disulfide, tetrabutyl thiuram disulfide, etc.; halogenated hydrocarbons, such as carbon tetrachloride, ethylene bromide, etc.; hydrocarbons, such as pentaphenylethane, etc.; unsaturated cyclic hydrocarbon compounds, such as acrolein, methacrolein, aryl alcohols, 2-ethylhexyl thioglycolate, terpinolene, α-terpinene, γ-terpinene, dipentene, α-methylstyrene dimer (that which has no less than 50 weight parts of 2,4-diphenyl-4-methyl-1-pentene is preferable), 9,10-dihydroanthracene, 1,4-dihydronaphthalene, indene, 1,4-cyclohexadiene, etc; and unsaturated heterocyclic compounds, such as xanthene, 2,5-dihydrofuran, etc.

In the process of polymerization, a surfactant may be added according to need. As the surfactant, sodium lauryl sulfate or potassium lauryl sulfate may be used, and besides these, an anionic surfactant, nonionic surfactant, or amphoteric surfactant may be used.

The polymerization may be carried out as solution polymerization under the presence of abovementioned polymerization initiator and in a solvent, such as an aliphatic hydrocarbon solvent, aromatic hydrocarbon solvent, ester solvent, ketone solvent, alcohol solvent, aprotic solvent, etc. The polymerization is normally carried out at 30 to 100° C. and preferably at 50 to 80° C. for 1 to 10 hours, and the conditions are selected as suited according to the types of polymerization initiator, monomer, solvent, etc., that are used. Also, the polymerization is preferably carried out under nitrogen or other inert gas atmosphere. After polymerization, the copolymer can be isolated by a known method, such as reprecipitation, solvent distillation, etc. Also, the obtained copolymer can be removed of unreacted monomer, etc., and refined by reprecipitation, membrane separation, chromatography, extraction, etc.

A polymer with a carboxylic group, such as the present polymer, is preferably ionized by a neutralizer (alkaline agent). As the neutralizer (alkaline agent), an inorganic alkali, such as sodium hydroxide, potassium hydroxide, lithium hydroxide, etc., or an organic amine, such as ammonia, trimethylamine, tripropylamine, tributylamine, diethylmethylamine, dipropylmethylamine, dibutylmethylamine, dipropylbutylamine, triethanolamine, tripropanolamine, tributanolamine, etc., may be used. In synthesizing the present polymer, the composition of the polymerizable monomers is designed to be a preferable monomer composition as described above.

(Production of Hydrophilic Group-Localized Polymer)

The hydrophilic group-localized polymer is manufactured in a specific polymerization sequence by the above polymerization technique. One possible procedure starts polymerization of a monomer composition including the hydrophilic group-containing monomer as the main component to synthesize a prepolymer and copolymerizes another monomer composition with the prepolymer to produce the hydrophilic group-localized polymer. Namely the hydrophilic group-localized polymer may be manufactured by copolymerization of the hydrophilic prepolymer with the monomer composition including the hydrophobic group-containing monomer. In this structure, the prepolymer-deviated chain forms the polymer end having the localized hydrophilic group. A carboxyl group-containing polymerization initiator, for example, 4,4'-azobis-4,cyanovaleric acid, may be used in this polymerization process.

Another possible procedure starts polymerization of a monomer composition other than the hydrophilic group-containing monomer to synthesize a prepolymer and copolymerizes the hydrophilic group-containing monomer with the prepolymer to produce the hydrophilic group-localized polymer. Namely the hydrophilic group-localized polymer may be manufactured by copolymerization of the hydrophobic prepolymer with the hydrophilic group-containing monomer. In this structure, the polymer chain added to the prepolymer forms the polymer end having the localized hydrophilic group. The preferable procedure of manufacturing the hydrophilic group-localized polymer copolymerizes the hydrophilic group-containing monomer with the prepolymer mainly composed of the monomer composition other than the hydrophilic group-containing monomer. This arrangement ensures the efficient addition of the hydrophilic group-containing monomer to one or both ends of the prepolymer to readily localize the hydrophilic group at the polymer end.

(Polymer-Coated Pigment and Pigment Dispersion of Polymer-Coated Pigment)

In the aqueous ink composition of the invention, it is preferable that the pigment is coated with the water-dispersible polymer and is dispersed in the form of polymer-coated pigment (microcapsulated pigment). The polymer-coated pigment represents a pigment coated with or microcapsulated in a polymer compound to be dispersible in an aqueous medium. The pigment dispersion of the invention has an aqueous phase of the polymer-coated pigment dispersed therein.

(Manufacturing Method of Polymer-Coated Pigment)

The polymer-coated pigment may be produced by any of known physical, mechanical, and chemical techniques, for example, phase separation method (coacervation), in-liquid drying method (interfacial precipitation method), spray drying method, pancoating method, in-liquid curing coating method, interfacial polymerization method, in situ coating method, and ultrasonic coating method. The polymer-coated pigment used in the ink composition of the invention may be obtained by a manufacturing method of an anionic polymer-coated pigment disclosed in Japanese Patent Laid-Open Gazette No. H09-151342 or a manufacturing method disclosed in Japanese Patent Laid-Open Gazette No. H10-316909.

(Coating Pigment with Polymer by Polymerization)

The polymer-coated pigment is obtained by polymerization, for example, emulsion polymerization, of the monomer materials of the water-dispersible polymer of the invention in the presence of a pigment. Polymerizable monomers, a polymerization initiator, and a chain transfer agent when required, are added to a pigment dispersion system and are polymerized under preset conditions. The pigment dispersion system may include a dispersant having a group copolymerizable with another monomer. One concrete procedure places a pigment, water, and a polymerizable surfactant when required, in a reaction vessel with an ultrasonic generator, a stirrer, and a temperature regulator and applies ultrasonic waves to crush the mixture. The ultrasonic dispersion technique with the ultrasonic generator may be replaced by the general dispersion technique with a dispersing device, for example, a ball mill, a roll mill, an Eiger mill, a high-speed mixer, a bead mill, or a sand mill. The procedure then adds monomers and a polymerization initiator to the reaction vessel to induce the polymerization reaction at a preset polymerization temperature and obtain the polymer-coated pigment. The chain transfer agent may be added to the reaction vessel according to the requirements.

(Coating Pigment with Polymer by Phase Inversion Emulsification)

Another preferable technique for manufacturing the polymer-coated pigment is phase inversion emulsification. The water-dispersible polymer applied to the phase inversion emulsification is preferably synthesized by solution polymerization with a radical polymerization initiator. The water-dispersible polymer prepared by solution polymerization may directly be subjected to a pigment dispersion process. The pigment dispersion process by the phase inversion emulsification technique prepares a solution mixture including a polymer, a pigment, an organic solvent, and excess water relative to the organic solvent to disperse the pigment coated with at least part of the polymer in an aqueous phase of the solution mixture. The polymer and the pigment included in the aqueous phase of the pigment dispersion may be used separately from the aqueous phase or together with at least part of the aqueous phase for preparation of the aqueous ink composition. The organic solvent is removed in the phase inversion emulsification process.

One procedure of the pigment dispersion process disperses a pigment in an organic solvent to prepare a pigment dispersion of the organic solvent, disperses or dissolves a polymer in water to prepare an aqueous polymer dispersion, and mixes the pigment dispersion of the organic solvent with the aqueous polymer dispersion. This attains the phase inversion emulsification and makes the pigment coated with the polymer located in the vicinity of the pigment surface in the aqueous phase. Another procedure of the pigment dispersion process prepares an organic solvent dispersion including both a pigment and a polymer (may additionally include one or a combination of a neutralizing agent, water, and a surfactant) and mixes the organic solvent dispersion with a large amount of water (preferably excess water relative to the organic solvent). This causes transfer of the pigment and the polymer from the organic solvent phase to the aqueous phase and makes the pigment coated with (or microcapsulated in) the polymer in the aqueous phase.

The pigment dispersion process stirs or agitates the pigment in the mixture of the organic solvent and water to disperse the pigment in the aqueous phase by application of ultrasonic waves or with any of adequate dispersing devices, for example, a high-pressure homogenizer, an ultra high-pressure homogenizer, a high-speed mixer, a sand mill, a bead mill, and a roll mill. The pigment dispersion process by the phase inversion emulsification technique preferably uses a mixing and stirring device with a shear force to cause the polymer to be in contact with and adhere to the surface of the pigment.

As described previously, the pigment is preferably dispersed by the water-dispersible polymer in the aqueous phase as the primary particles having the average primary particle diameter of not greater than 50 nm and as the secondary particles having the ratio of the average secondary particle diameter to the average primary particle diameter in the range of 1 to 10. The preferable dispersion is specified by the particle design of the pigment and the structure of the water-dispersible polymer described above.

The organic solvent used for preparation of the pigment dispersion is not specifically restricted, but low-boiling point organic solvents are desirably used because of their easy removal. Preferable examples include ketones like acetone and methyl ethyl ketone, esters like ethyl acetate, alcohols like ethanol and isopropyl alcohol, and aromatic hydrocarbons like benzene.

Any of various organic amines as well as inorganic alkalis may be used as a neutralizing agent to dissolve or disperse the polymer having an acid group, such as carboxyl group, in water. The neutralizing agent is preferably an inorganic alkali.

For separation of the polymer and the pigment (in the form of the polymer-coated pigment) from the aqueous phase, the organic solvent is removed from the pigment dispersion having the aqueous phase of the dispersed polymer-coated pigment by an adequately selected technique, for example, heating, centrifugation, water washing, ultrafiltration, or pressure filtration.

The pigment dispersion having the aqueous phase of the dispersed polymer-coated pigment is suitable for preparation of the ink composition of the invention. This pigment dispersion gives the ink composition having the well-dispersed pigment. The invention accordingly provides a method of preparing the ink composition from the pigment dispersion.

(Water-Soluble Organic Solvent)

The ink composition of the invention further contains water and a water-soluble organic solvent, which constitute at least part of an aqueous medium used for preparation of the pigment dispersion. The water-soluble organic solvent is preferably any one or any combination of polar solvents, for example, 2-pyrrolidone, N-methylpyrrolidone, α-caprolactam, dimethylsulfoxide, sulfolane, morpholine, N-ethylmorpholine, and 1,3-dimethyl-2-imidazolidione. The total content of the polar solvent is preferably in a range of 0.01% to 20% or more preferably in a range of 1% to 10% relative to the total weight of the ink for inkjet recording.

The ink composition of the invention is adequately used for the general writing ink, as well as the ink for inkjet recording. Various additives may be added to the ink composition for inkjet recording to attain the storage stability and the stable ejection from an inkjet head and to prevent clogging and ink deterioration. Such additives include a moisturizing agent, a dissolution aid, a penetration controller, a viscosity modifier, a pH adjuster, an antioxidant, an antiseptic agent, a fungicide, a corrosion inhibitor, and a chelating agent for trapping metal ions interfering with the dispersion.

The ink composition for inkjet recording preferably has a high-boiling point, water-soluble organic solvent as a moisturizing agent to give the sufficient water retention ability and the sufficient moisture. The high-boiling point, water-soluble organic solvent may be any one or any combination of various polyalcohols including ethylene glycol, diethylene glycol, triethylene glycol, polyethylene glycol (preferably having the molecular weight of not greater than 2000), propylene glycol (1,2-propanediol), dipropylene glycol, polypropylene glycol, butylene glycol, 1,3-propylene glycol, isopropylene glycol, isobutylene glycol, 1,4-butanediol, 1,3-butanediol, 1,3-pentanediol, 1,3-hexanediol, 1,3-heptanediol, 1,3-octanediol, 1,5-pentanediol, 1,6-hexanediol, 1,2,6-hexanetriol, thioglycol, hexylene glycol, glycerol, mesoerythritol, pentaerythritol, and trimethylolpropane. Especially preferable are glycerol and 1,3-alkanediols. The total content of the high-boiling point, water-soluble organic solvent is preferably in a range of 0.01 to 20% or more preferably in a range of 5 to 20% relative to the total weight of the ink composition for inkjet recording.

Various saccharides may be used to prevent ink from drying to clog the nozzles. Both monosaccharides and polysaccharides are usable for this purpose; for example, glucose, mannose, fructose, ribose, xylose, arabinose, lactose, galactose, aldonic acid, glucitol, maltose, cellobiose, sucrose, trehalose, and maltotriose. Alginic acid and its salts, cyclodextrins, and celluloses are also usable for the same purpose. The preferable content of the saccharide is not less than 0.05% and not greater than 30%. The content of less than 0.05% does not ensure the sufficient effects to prevent ink from drying to clog the nozzle head. The content of greater than 30%, on the other hand, undesirably increases the viscosity of ink to interfere with smooth printing. The preferable content is in a range of 3 to 20% for these typical monosaccharides and polysaccharides including glucose, mannose, fructose, ribose, xylose, arabinose, lactose, galactose, aldonic acid, glucitol, maltose, cellobiose, sucrose, trehalose, and maltotriose. The content should be regulated to ensure the sufficient viscosity of resulting ink for alginic acid and its salts, cyclodextrins, and celluloses.

A penetrant is preferably added to the ink composition to accelerate penetration of the aqueous solvent to a recording medium. The prompt penetration of the aqueous solvent to the recording medium ensures recorded images with little ink bleed. Available compounds for the penetrant include: alkyl alcohols of 1 to 4 carbon atoms, for example, methanol and ethanol; alkyl ethers of polyalcohols (glycol ethers), for example, ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, ethylene glycol mono-n-propyl ether, ethylene glycol mono-iso-propyl ether, diethylene glycol mono-iso-propyl ether, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, dipropylene glycol mono-iso-propyl ether, propylene glycol mono-n-butyl ether, and dipropylene glycol mono-n-butyl ether; and linear alkyl-diols, for example, 1,3-propanediol, 1,4-butanediol, 1,5-pentanediol, 1,6-hexanediol, 1,7-heptanediol, 1,8-octanediol, 1,2-pentanediol, and 1,2-hexanediol. Such alkylene glycol monoalkyl ethers and alkyl-diols are added to the ink composition to adjust the surface tension to an adequate range.

Preferable compounds are 4 to 10 carbon atoms-containing alkyl ethers of alkylene glycols having 10 or less repeating units, for example, ethylene glycol mono-n-butyl ether, diethylene glycol mono-n-butyl ether, triethylene glycol mono-n-butyl ether, ethylene glycol mono-t-butyl ether, diethylene glycol mono-t-butyl ether, propylene glycol mono-t-butyl ether, propylene glycol mono-n-butyl ether, and dipropylene glycol mono-n-butyl ether. Specifically preferable is one or multiple compounds selected from diethylene glycol monobutyl ether, triethylene glycol monobutyl ether, dipropylene glycol monobutyl ether, and tripropylene glycol monobutyl ether. It is desirable to add any of 1,2-alkanediols of 5 to 8 carbon atoms, such as 1,2-hexanediol and 1,2-heptanediol, to the ink composition, together with or independently of the alkylene glycol alkyl ether. Addition of 1,2-hexanediol and/or 1,2-heptanediol improves the print drying property and effectively prevents transfer of a printed image on one printing medium to the rear face of another printing medium even in continuous printing. This enables high-speed inkjet printing.

The content of the penetrant is preferably not greater than 30%, specifically not greater than 20%, or more specifically not greater than 10% relative to the total weight of the ink composition for inkjet recording.

The ink composition preferably contains one or multiple penetrants selected among di(tri)ethylene glycol monobutyl ethers, di(tri)propylene glycol monobutyl ethers, and 1,2-alkanediols in a range of 0.5% to 30% relative to the total weight.

The ink composition of the invention may further include a surfactant to control the penetration into a medium, such as plain paper or special paper. The preferable surfactant added to the ink composition has high compatibility to the ink composition system, high permeability, and high stability. Amphoteric surfactants and nonionic surfactants are applicable for this purpose. Available amphoteric surfactants include lauryldimethylaminoacetic acid betaine, 2-alkyl-N-carboxymethyl-N-hydroxyethylimidazolinium betaine, coconut oil fatty acid amidopropyldimethylaminoacetic acid betaine, polyoctylpolyaminoethylglycine, and other imidazoline derivatives. Available nonionic surfactants include: ethers, for example, polyoxyethylene nonyl phenyl ether, polyoxyethylene octyl phenyl ether, polyoxyethylene dodecyl phenyl ether, polyoxyethylene alkyl allyl ether, polyoxyethylene oleyl ether, polyoxyethylene lauryl ether, polyoxyethylene alkyl ether, polyoxyalkylene alkyl ether (polyoxypropylene, polyoxyethylene alkyl ethers); esters, for example, polyoxyethylene oleic acid, polyoxyethylene dioleate, polyoxyethylene distearate, sorbitan laurate, sorbitan monostearate, sorbitan monooleate, sorbitan sesquiolate, polyoxyethylene monooleate, and polyoxyethylene monostearate; and fluorine-containing surfaceants, for example, fluorine alkyl esters and perfluoroalkyl carboxylates.

The ink composition preferably includes one or multiple surfactants selected among acetylene alcohol surfactants, acetylene glycol surfactants, and silicone surfactants. Addition of such surfactants adjusts the surface tension to an adequate range (not less than 20 mN/m and not greater than 40 mN/m). These surfactants especially reduce the potential ink bleed on plain paper, while regulating the line width to an adequate range on special paper. The surface tension of the ink composition is measurable by auto surface tension meter CBVP-A3 (manufactured by Kyowa Interface Science Co., Ltd) or any of other measuring devices having equivalent accuracy.

The acetylene glycol surfactant is preferably used together with any of the glycol ethers listed previously. For example, the acetylene glycol surfactant is any of acetylene glycol compounds expressed by General Formula (1) given below.

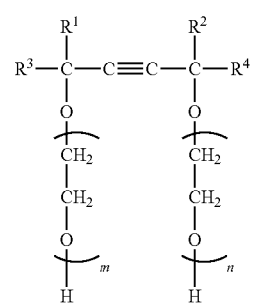

Formula (1)

In the above formula (1), m and n denote numbers satisfying $0 \leq m+n \leq 50$ and $R^1$, $R^2$, $R^3$, and $R^4$ independently denote alkyl groups (preferably alkyl groups of 6 or less carbon atoms). Especially preferable compounds among those expressed by General Formula (1) are 2,4,7,9-tetramethyl-5-decyne-4,7-diol, 3,6-dimethyl-4-octyne-3,6-diol, and 3,5-dimethyl-1-hexyn-3-ol. The compounds expressed by General Formula (1) may be commercially available acetylene glycol surfactants, for example, Surfynol 104, 82, 440, 465, 485 and Surfynol STG (available from Air Products and Chemicals Inc.), Olfine STG and Olfine E1010 (manufactured by Nisshin Chemical Industry Co., Ltd).

The commercially available acetylene alcohol surfactants are, for example, Olfine P and Olfine B (manufactured by Air Products and Chemicals Inc.) and Surfynol 61 (manufactured by Nisshin Chemical Industry Co., Ltd). A dissolution aid may be used together with the acetylene alcohol surfactant. Preferable examples of the dissolution aid include dimethyl-2-imidazolidinone, 2-pyrrolidone, and N-methyl-2-pyrrolidone. The commercially available silicone surfactants are, for example, BYK-301, 302, 307, 325, 331, 341, 345, 346, 348, and 375 (manufactured by BYK Chemie). The content of the surfactant is preferably in a range of 0.01% to 10% or more preferably in a range of 0.1% to 5% relative to the total weight of the ink composition for inkjet recording.

The aqueous ink composition of the invention preferably includes one or multiple surfactants selected among the acetylene alcohol surfactants, the acetylene glycol surfactants, and the silicone surfactants and one or multiple penetrants selected among di(tri)ethylene glycol monobutyl ethers, di(tri)propylene glycol monobutyl ethers, and 1,2-alkanediols. The preferable content of one or multiple surfactants selected among the acetylene alcohol surfactants, the acetylene glycol surfactants, and the silicone surfactants is in a range of 0.01% to 0.5%. The preferable content of one or multiple penetrants selected among di(tri)ethylene glycol monobutyl ethers, di(tri)propylene glycol monobutyl ethers, and 1,2-alkanediols is not less than 1%.

Available compounds as the pH adjuster, the dissolution aid, and the antioxidant include: amines and modified amines, for example, diethanolamine, triethanolamine, propanolamine, and morpholine; inorganic salts, for example, potassium hydroxide, sodium hydroxide, and lithium hydroxide; ammonium hydroxide and tert-ammonium hydroxides (for example, tetramethyl ammonium); carbonates, for example, potassium (hydrogen)carbonate, sodium (hydrogen)carbonate, and lithium (hydrogen)carbonate; phosphates; urea compounds, for example, N-methyl-2-pyrrolidone, urea, thiourea, and tetramethylurea; allophanates, for example, allophanate and methyl allophanate; biurets, for example, biuret, dimethylbiuret, and tetramethylbiuret; and L-ascorbic acid and ascorbates. Commercially available antioxidants and ultraviolet absorbers may also be used for the same purpose.

Available compounds as the viscosity modifier include rosins, alginic acid and alginates, polyvinyl alcohol, hydroxypropyl cellulose, carboxymethyl cellulose, hydroxyethyl cellulose, methyl cellulose, polyacrylates, polyvinylpyrrolidone, gum acacia, and starch.

Available compounds as the antiseptic include alkyl isothiazolones, chloroalkyl isothiazolones, benzisothiazolone, bromonitro alcohol, oxazolidine compounds, and chloroxylenol. Available compounds as the chelating agent include ethylenediamine acetates and nitrilotriacetates. Available compounds as the corrosion inhibitor include dicyclohexylammonium nitrate and benzotriazole.

Another application of the invention is a recording method, which includes an image formation step of making the ink composition of the invention applied to the surface of a recording medium to form an image on the recording medium. This recording method ensures the excellent recording quality of images according to the type of the recording medium with or without gloss. The recorded images on glossy media have favorable glossiness and color development, whereas the recorded images on non-glossy media have good optical densities. The recorded images also have sufficient image fastness, which is characteristic of pigment inks. The recording method of the invention may be any of diverse printing methods, for example, an inkjet recording method and a recording method with a writing material, such as a pen. An especially preferable recording method with the ink composition of the invention is the inkjet recording method, specifically the inkjet recording method that ejects ink by vibrations of electrostriction elements in response to electrical signals, or more specifically the inkjet recording method using piezoelectric elements. The resulting recorded matters printed by the inkjet recording method with the ink composition of the invention have both the excellent recording quality and the sufficient image fastness. The inkjet recording method ensures the long-term stability and is thus desirably applicable to record images, such as photographs.

Embodiment 1

The invention is described concretely with reference to some examples. These examples are only illustrative and are not restrictive in any sense. The measurement items and the measurement methods adopted in this embodiment for evaluation are given below.

(Measurement Methods)

(Measurement of Optical Density (OD))

The optical density was measured by spectrolino photodensitometry (Gregag Macbeth Spectroscan SPM-50 manufactured by GretagMacbeth AG).

(Measurement of Glossiness)

The specular glossiness on the print surface was measured at an incident angle of 60 degrees with a gloss checker (IG-320 manufactured by Horiba Ltd.). The five measurements were averaged. The printing medium and the printer used for this test were PM photo paper and EM930C (both manufactured by Seiko Epson Corporation). The printing resolution was Photo720 dpi.

Examples 1 to 4

(1) Preparation of Pigment Dispersions (Pigment Dispersion 1)

The pigment of a pigment dispersion 1 was carbon black Monarch 880 (manufactured by Cabot Corporation). A material mixture containing 65 parts of para-cumylphenoxyethyleneglycol acrylate, 10 parts of benzyl acrylate, 2 parts of acrylic acid, and 0.3 parts of t-dodecyl mercaptan was heated at 70° C. in a nitrogen-replaced reaction vessel equipped with a stirrer, a thermometer, a reflux condenser, and a dropping funnel. A solution mixture containing 150 parts of para-cumylphenoxyethyleneglycol acrylate, 5 parts of butyl acrylate, 1 part of t-dodecyl mercaptan, 20 parts of methyl ethyl ketone, and 1 part of azobisisovaleronitrile in the dropping funnel was added dropwise to the heated material mixture in the reaction vessel for 4 hours for polymerization. After addition of 10 parts of acrylic acid, the mixture was allowed to react for another 2 hours to synthesize a dispersible polymer. Further addition of methyl ethyl ketone to the synthesized dispersible polymer in the reaction vessel gave a 40% dispersible polymer solution.

A reaction mixture including 40 parts of the dispersible polymer solution, 30 parts of carbon black Monarch 880 (manufactured by Cabot Corporation), 100 parts of 0.1 mol/L aqueous sodium hydroxide, and 30 parts of methyl ethyl ketone was stirred in an ultra-high-pressure homogenizer for 30 minutes. After addition of 300 parts of ion exchange water, the mixture was further stirred for 1 hour. The mixture was rotary evaporated for removal of the whole content of methyl ethyl ketone and part of water, was neutralized with 0.1 mol/L aqueous sodium hydroxide to pH 9, and was filtered through a membrane filter of 0.3 μm in pore diameter. The pigment dispersion 1 thus obtained had a solid content (dispersible polymer+carbon black) of 20% and a pigment-to-dispersible polymer weight ratio of 80 to 20.

(Pigment Dispersion 2)

A pigment dispersion 2 was prepared in the same manner as the pigment dispersion 1, except that the pigment used was C.I. Pigment Blue 15:3 (copper phthalocyanine manufactured by Clariant International Ltd.) and that the filtrate was adjusted to have a pigment-to-dispersible polymer weight ratio of 55 to 45.

(Pigment Dispersion 3)

A pigment dispersion 3 was prepared in the same manner as the pigment dispersion 1, except that the pigment used was C.I. Pigment Red 122 (dimethyl quinacridone manufactured by Clariant International Ltd.) and that the filtrate was adjusted to have a pigment-to-dispersible polymer weight ratio of 75 to 25.

(Pigment Dispersion 4)

A pigment dispersion 4 was prepared in the same manner as the pigment dispersion 1, except that the pigment used was C.I. Pigment Yellow 180 (diketopyrrolopyrrole manufactured by Clariant International Ltd.) and that the filtrate was adjusted to have a pigment to dispersible polymer weight ratio of 75 to 25.

(2) Preparation of Ink Compositions

Ink compositions of Examples 1 to 4 suitable for inkjet recording ink were prepared from the respective pigment dispersions 1 to 4 according to Table 1. The content of each pigment dispersion in Table 1 represents the weight conversion of the solid content (the total sum of the pigment and the dispersible polymer). Ion exchange water added by the remaining quantity to complete preparation of each ink composition in Table 1 contained additives, 0.05% Top Side 240 (manufactured by Permachem Asia Ltd.) for corrosion control of the ink composition, 0.02% benzotriazole for corrosion control of inkjet head members, and 0.04% EDTA (ethylenediamine tetraacetic acid).2Na for the reduced effects of metal ions in the ink composition.

Comparative Examples 1 to 4

Pigment Dispersions 5 to 8 and ink compositions of Comparative Examples 1 to 4 were prepared according to Table 1.

(Pigment Dispersion 5)

The pigment of a pigment dispersion 5 was carbon black Monarch 880 (manufactured by Cabot Corporation), like the pigment dispersion 1. A material mixture containing 65 parts of para-cumylphenoxyethyleneglycol acrylate, 10 parts of benzyl acrylate, 2 parts of acrylic acid, and 0.3 parts of t-dodecyl mercaptan was heated at 70° C. in a nitrogen-replaced reaction vessel equipped with a stirrer, a thermometer, a reflux condenser, and a dropping funnel. A solution mixture containing 150 parts of para-cumylphenoxyethyleneglycol acrylate, 5 parts of butyl acrylate, 1 part of t-dodecyl mercaptan, 15 parts of acrylic acid, 20 parts of methyl ethyl ketone, and 1 part of azobisisovaleronitrile in the dropping funnel was added dropwise to the heated material mixture in the reaction vessel for 4 hours for polymerization to synthesize a dispersible polymer. Further addition of methyl ethyl ketone to the synthesized dispersible polymer in the reaction vessel gave a 40% dispersible polymer solution.

A reaction mixture including 40 parts of the dispersible polymer solution, 30 parts of carbon black Monarch 880 (manufactured by Cabot Corporation), 100 parts of 0.1 mol/L aqueous sodium hydroxide, and 30 parts of methyl ethyl ketone was stirred in an ultra-high-pressure homogenizer for 30 minutes. After addition of 300 parts of ion exchange water, the mixture was further stirred for 1 hour. The mixture was rotary evaporated for removal of the whole content of methyl ethyl ketone and part of water, was neutralized with 0.1 mol/L aqueous sodium hydroxide to pH 9, and was filtered through a membrane filter of 0.3 μm in pore diameter. The pigment dispersion 5 thus obtained had a solid content (dispersible polymer+carbon black) of 20% and a pigment-to-dispersible polymer weight ratio of 80 to 20.

(Pigment Dispersion 6)

A pigment dispersion 6 was prepared in the same manner as the pigment dispersion 5, except that the pigment used was C.I. Pigment Blue 15:3 (copper phthalocyanine manufactured by Clariant International Ltd.) and that the filtrate was adjusted to have a pigment-to-dispersible polymer weight ratio of 55 to 45.

(Pigment Dispersion 7)

A pigment dispersion 7 was prepared in the same manner as the pigment dispersion 5, except that the pigment used was C.I. Pigment Red 122 (dimethyl quinacridone manufactured by Clariant International Ltd.) and that the filtrate was adjusted to have a pigment-to-dispersible polymer weight ratio of 75 to 25.

(Pigment Dispersion 8)

A pigment dispersion 8 was prepared in the same manner as the pigment dispersion 5, except that the pigment used was C.I. Pigment Yellow 180 (diketopyrrolopyrrole manufactured by Clariant International Ltd.) and that the filtrate was adjusted to have a pigment to dispersible polymer weight ratio of 75 to 25.

TABLE 1

| | Ink Composition | | | | | | | |
|---|---|---|---|---|---|---|---|---|
| | Examples | | | | Comparative Examples | | | |
| | 1 | 2 | 3 | 4 | 5 | 6 | 7 | 8 |
| Dispersion 1 | 8 | — | — | — | — | — | — | — |
| Dispersion 2 | — | 7 | — | — | — | — | — | — |
| Dispersion 3 | — | — | 8 | — | — | — | — | — |

TABLE 1-continued

| | Ink Composition | | | | | | | |
|---|---|---|---|---|---|---|---|---|
| | Examples | | | | Comparative Examples | | | |
| | 1 | 2 | 3 | 4 | 5 | 6 | 7 | 8 |
| Dispersion 4 | — | — | — | 8 | — | — | — | — |
| Dispersion 5 | — | — | — | — | 8 | — | — | — |
| Dispersion 6 | — | — | — | — | — | 7 | — | — |
| Dispersion 7 | — | — | — | — | — | — | 8 | — |
| Dispersion 8 | — | — | — | — | — | — | — | 8 |
| TEGmBE | 2 | 1 | 1 | 1 | 2 | 1 | 1 | 1 |
| 1,2-hexanediol | 3 | 4 | 4 | 4 | 3 | 4 | 4 | 4 |
| Glycerin | 10 | 15 | 10 | 10 | 10 | 15 | 10 | 10 |
| Trimethylolpropane | 4 | 7 | 5 | 5 | 4 | 7 | 5 | 5 |
| Surfynol 104 | 0.1 | 0.1 | 0.1 | 0.1 | 0.1 | 0.1 | 0.1 | 0.1 |
| Ion-exchanged water | Residual quantity | Residual quantity | Residual quantity | Residual quantity | Residual quantity | Residual quantity | Residual quantity | Residual quantity |

TEGmBE: triethylene glycol monobutyl ether
Surfynol 104: acetylene glycol surfactant, made by Nissin Chemical Industry Co., Ltd.

(3) Evaluation of Ink Compositions

The ink compositions of Examples 1 to 4 and Comparative Examples 1 to 4 were evaluated for the optical density (OD) on a non-glossy medium or plain paper and for the glossiness on a glossy medium or glossy paper. The plain paper used was Xerox4024 Paper (manufactured by Xerox Corporation, the US) and the glossy paper used was PM Photo Paper (Manufactured by Seiko Epson Corporation, Japan). The printer used for the evaluation was Inkjet Printer EM930C manufactured by Seiko Epson Corporation. The print mode adopted was 720 dpi for the plain paper and 1440 dpi for the glossy paper. The results of the evaluation are shown in Table 2.

TABLE 2

OD on Plain Paper and Glossiness on Glossy Paper

| | OD on plain paper | Glossiness on glossy paper |
|---|---|---|
| Example 1 | 1.45 | 60 |
| Example 2 | 1.37 | 75 |
| Example 3 | 1.32 | 70 |
| Example 4 | 1.35 | 80 |
| Comparative Example 1 | 1.24 | 50 |
| Comparative Example 2 | 1.18 | 55 |
| Comparative Example 3 | 1.15 | 53 |
| Comparative Example 4 | 1.17 | 57 |

As clearly understood from Table 2, the ink compositions of Examples 1 to 4 had better measurement results of both the OD on the plain paper and the glossiness on the glossy paper, whereas the ink compositions of Comparative Examples 1 to 4 had poor measurement results of both the OD on the plain paper and the glossiness on the glossy paper. Comparison between the measurement results of Examples 1 to 4 and those of Comparative Examples 1 to 4 proves that the localized presence of the hydrophilic group-containing monomer at a polymer end of the water dispersible polymer ensures the better recording quality of images on both the glossy medium and the non-glossy medium.

Embodiment 2

The invention is described concretely with reference to some other examples. These examples are only illustrative and are not restrictive in any sense.

These examples were evaluated by the following measurement methods:

(Average Primary Particle Diameter)

Each of pigment dispersions obtained in Examples and Comparative Examples was diluted by 50 times. A copper mesh for TEM observation soaked in and taken from the diluted pigment dispersion was vacuum-dried for 12 hours in low vacuum to a test sample. The test sample was observed by FE-TEM (field emission transmission electron microcopy, CM200FEG manufactured by Royal Philips Electronics, the Netherlands: accelerating voltage 120 kV), and 100 primary pigment particles observable as single particles in the TEM micrograph were extracted at random. The average primary particle diameter was statistically computed by image processing of the extracted primary pigment particles.

(Average Secondary Particle Diameter)

Each of the pigment dispersions obtained in Examples was evaluated by capillary hydrodynamic fractionation with a capillary particle size distribution analyzer (CHDF-2000 manufactured by Matec Applied Sciences, the USA).

(Measurement of Glass Transition Temperature of Polymer)

The glass transition temperature of each polymer used (the minimum glass transition temperature when the polymer has plural glass transition temperatures) was measured by differential scanning calorimetry DSC-220 (manufactured by Seiko Instruments Inc., Japan) in a temperature range of −30° C. to 250° C. at a temperature rising rate of 10° C./minute.

(Measurement of Optical Density (OD))

The optical density was measured by spectrolino photo-densitometry (Gregag Macbeth Spectroscan SPM-50 manufactured by GretagMacbeth AG).

(Measurement of Glossiness)

The specular glossiness on the print surface was measured at an incident angle of 60 degrees with a gloss checker (IG-320 manufactured by Horiba Ltd.). The five measurements were averaged. The printing medium and the printer used for this test were PM photo paper and EM930C (both manufactured by Seiko Epson Corporation). The printing resolution was Photo720 dpi.

(Measurement of Lightfastness)

The lowering rate of OD value to initial OD value after exposure to light of 7000lxs by Xenon Weather Meter X75

(manufactured by Suga Test Instruments Co., Ltd.) was measured with respect to printing on PM photo paper by PM photo paper and EM930C (manufactured by Seiko Epson Corporation) with the printing solution of 720 dpi. OD was measured in the same manner as described above.

Examples 1B to 4B

Pigment Dispersions 1B to 4B were prepared, and ink compositions of Examples 1B to 4B according to the invention were then prepared from the pigment dispersions 1B to 4B.

(1) Preparation of Pigment Dispersions (Pigment Dispersion 1B)

The pigment of a pigment dispersion 1B was carbon black Monarch 880 (manufactured by Cabot Corporation). A material mixture containing 65 parts of para-cumylphenoxyethyleneglycol acrylate, 10 parts of benzyl acrylate, 2 parts of acrylic acid, and 0.3 parts of t-dodecyl mercaptan was heated at 70° C. in a nitrogen-replaced reaction vessel equipped with a stirrer, a thermometer, a reflux condenser, and a dropping funnel. A solution mixture containing 150 parts of para-cumylphenoxyethyleneglycol acrylate, 5 parts of butyl acrylate, 1 part of t-dodecyl mercaptan, 15 parts of acrylic acid, 20 parts of methyl ethyl ketone, and 1 part of azobisisovaleronitrile in the dropping funnel was added dropwise to the heated material mixture in the reaction vessel for 4 hours for polymerization to synthesize a dispersible polymer. Further addition of methyl ethyl ketone to the synthesized dispersible polymer in the reaction vessel gave a 40% dispersible polymer solution.

A reaction mixture including 40 parts of the dispersible polymer solution, 30 parts of carbon black Monarch 880 (manufactured by Cabot Corporation), 100 parts of 0.1 mol/L aqueous sodium hydroxide, and 30 parts of methyl ethyl ketone was stirred in an ultra-high-pressure homogenizer for 30 minutes. After addition of 300 parts of ion exchange water, the mixture was further stirred for 1 hour. The mixture was rotary evaporated for removal of the whole content of methyl ethyl ketone and part of water, was neutralized with 0.1 mol/L aqueous sodium hydroxide to pH 9, and was filtered through a membrane filter of 0.3 μm in pore diameter. The pigment dispersion 1B thus obtained had a solid content (dispersible polymer+carbon black) of 20% and a pigment-to-dispersible polymer weight ratio of 80 to 20. The prepared pigment dispersion 1B had an average primary particle diameter of 45 nm and an average secondary particle diameter of 80 nm. The ratio of the average secondary particle diameter to the average primary particle diameter was 1.8, and the glass transition temperature Tg of the polymer was 20° C.

(Pigment Dispersion 2B)

A pigment dispersion 2B was prepared in the same manner as the pigment dispersion 1B, except that the pigment used was C.I. Pigment Blue 15:3 (copper phthalocyanine manufactured by Clariant International Ltd.) and that the filtrate was adjusted to have a pigment-to-dispersible polymer weight ratio of 55 to 45. The prepared pigment dispersion 2B had an average primary particle diameter of 35 nm and an average secondary particle diameter of 60 nm. The ratio of the average secondary particle diameter to the average primary particle diameter was 1.71, and the glass transition temperature Tg of the polymer was 20° C.

(Pigment Dispersion 3B)

A pigment dispersion 3B was prepared in the same manner as the pigment dispersion 1B, except that the pigment used was C.I. Pigment Red 122 (dimethyl quinacridone manufactured by Clariant International Ltd.) and that the filtrate was adjusted to have a pigment-to-dispersible polymer weight ratio of 75 to 25. The prepared pigment dispersion 3B had an average primary particle diameter of 45 nm and an average secondary particle diameter of 80 nm. The ratio of the average secondary particle diameter to the average primary particle diameter was 1.78, and the glass transition temperature Tg of the polymer was 20° C.

(Pigment Dispersion 4B)

A pigment dispersion 4B was prepared in the same manner as the pigment dispersion 1B, except that the pigment used was C.I. Pigment Yellow 180 (diketopyrrolopyrrole manufactured by Clariant International Ltd.) and that the filtrate was adjusted to have a pigment to dispersible polymer weight ratio of 75 to 25. The prepared pigment dispersion 4B had an average primary particle diameter of 50 nm and an average secondary particle diameter of 90 nm. The ratio of the average secondary particle diameter to the average primary particle diameter was 1.8, and the glass transition temperature Tg of the polymer was 20° C.

(2) Preparation of Ink Compositions

Ink compositions of Examples 1B to 4B suitable for inkjet recording ink were prepared from the respective pigment dispersions 1B to 4B according to Table 3. The content of each pigment dispersion in Table 3 represents the weight conversion of the solid content (the total sum of the pigment and the dispersible polymer). Ion exchange water added by the remaining quantity to complete preparation of each ink composition in Table 1 contained additives, 0.05% Top Side 240 (manufactured by Permachem Asia Ltd.) for corrosion control of the ink composition, 0.02% benzotriazole for corrosion control of inkjet head members, and 0.04% EDTA (ethylenediamine tetraacetic acid).2Na for the reduced effects of metal ions in the ink composition.

Comparative Examples 1B to 4B

Pigment Dispersions 5B to 8B and ink compositions of Comparative Examples 1B to 4B were prepared according to Table 1.

(Pigment Dispersion 5B)

A pigment dispersion 5B was prepared in the same manner as the pigment dispersion 1B, except that the pigment used had a different average primary particle diameter and a different average secondary particle diameter. The prepared pigment dispersion 5B had the average primary particle diameter of 20 nm and the average secondary particle diameter of 250 nm. The ratio of the average secondary particle diameter to the average primary particle diameter was 12.5, and the glass transition temperature Tg of the polymer was 20° C.

(Pigment Dispersion 6B)

A pigment dispersion 6B was prepared in the same manner as the pigment dispersion 2B, except that the pigment used had a different average primary particle diameter and a different average secondary particle diameter. The prepared pigment dispersion 6B had the average primary particle diameter of 80 nm and the average secondary particle diameter of 200 nm. The ratio of the average secondary particle diameter to the average primary particle diameter was 2.5, and the glass transition temperature Tg of the polymer was 20° C.

(Pigment Dispersion 7B)

A pigment dispersion 7B was prepared in the same manner as the pigment dispersion 3B, except that the pigment used had a different average primary particle diameter and a different average secondary particle diameter. The prepared pigment dispersion 7B had the average primary particle diameter of 100 nm and the average secondary particle diameter of 140 nm. The ratio of the average secondary particle diameter to the average primary particle diameter was 1.4, and the glass transition temperature Tg of the polymer was 20° C.

(Pigment Dispersion 8B)

A pigment dispersion 8B was prepared in the same manner as the pigment dispersion 4B, except that para-cumylphenoxyethyleneglycol acrylate was all replaced by styrene. The prepared pigment dispersion 8B had an average primary particle diameter of 50 nm and an average secondary particle diameter of 90 nm. The ratio of the average secondary particle diameter to the average primary particle diameter was 1.8, and the glass transition temperature Tg of the polymer was 100° C.

TABLE 4

OD on Plain Paper and Glossiness on Glossy Paper

| | Average Primary Particle Diameter | Average Secondary particle Diameter | Ratio | Glass Transition Temperature | OD | Glossiness |
|---|---|---|---|---|---|---|
| Example 1B | 45 | 80 | 1.8 | 20 | 1.45 | 65 |
| Example 2B | 35 | 60 | 1.71 | 20 | 1.37 | 75 |
| Example 3B | 45 | 80 | 1.78 | 20 | 1.32 | 70 |
| Example 4B | 50 | 90 | 1.8 | 20 | 1.35 | 80 |
| Comparative Example 1B | 20 | 250 | 12.5 | 20 | 1.34 | 45 |
| Comparative Example 2B | 80 | 200 | 2.5 | 20 | 1.22 | 55 |
| Comparative Example 3B | 100 | 140 | 2.0 | 20 | 1.20 | 53 |
| Comparative Example 4B | 50 | 90 | 1.8 | 100 | 1.37 | 37 |

TABLE 3

Ink Composition

| | Examples | | | | Comparative Examples | | | |
|---|---|---|---|---|---|---|---|---|
| | 1B | 2B | 3B | 4B | 5B | 6B | 7B | 8B |
| Dispersion 1B | 8 | — | — | — | — | — | — | — |
| Dispersion 2B | — | 7 | — | — | — | — | — | — |
| Dispersion 3B | — | — | 8 | — | — | — | — | — |
| Dispersion 4B | — | — | — | 8 | — | — | — | — |
| Dispersion 5B | — | — | — | — | 8 | — | — | — |
| Dispersion 6B | — | — | — | — | — | 7 | — | — |
| Dispersion 7B | — | — | — | — | — | — | 8 | — |
| Dispersion 8B | — | — | — | — | — | — | — | 8 |
| TEGmBE | 2 | 1 | 1 | 1 | 2 | 1 | 1 | 1 |
| 1,2-hexanediol | 3 | 4 | 4 | 4 | 3 | 4 | 4 | 4 |
| Glycerin | 10 | 15 | 10 | 10 | 10 | 15 | 10 | 10 |
| Trimethylolpropane | 4 | 7 | 5 | 5 | 4 | 7 | 5 | 5 |
| Surfynol 104 | 0.1 | 0.1 | 0.1 | 0.1 | 0.1 | 0.1 | 0.1 | 0.1 |
| Ion-exchanged water | Residual quantity | Residual quantity | Residual quantity | Residual quantity | Residual quantity | Residual quantity | Residual quantity | Residual quantity |

TEGmBE: triethylene glycol monobutyl ether
Surfynol 104: acetylene glycol surfactant, made by Nissin Chemical Industry Co., Ltd.

(3) Evaluation

The ink compositions of Examples 1B to 4B and Comparative Examples 1B to 4B were evaluated for the optical density (OD) on a non-glossy medium or plain paper and for the glossiness on a glossy medium or glossy paper. The plain paper used was Xerox4024 Paper (manufactured by Xerox Corporation, the US) and the glossy paper used was PM Photo Paper (Manufactured by Seiko Epson Corporation, Japan). The printer used for the evaluation was Inkjet Printer EM930C manufactured by Seiko Epson Corporation. The print mode adopted was 720 dpi for the plain paper and 1440 dpi for the glossy paper. The results of the evaluation are shown in Table 4.

As clearly understood from Table 4, the ink compositions of Examples 1B to 4B had better measurement results of both the OD on the plain paper and the glossiness on the glossy paper, whereas the ink compositions of Comparative Examples 1B to 4B had poor measurement results of either or both the OD on the plain paper and the glossiness on the glossy paper. Comparison between the measurement results of Examples 1B to 4B and those of Comparative Examples 1B to 4B proves that the pigment having the average primary particle diameter of not greater than 50 nm and the ratio of the average secondary particle diameter to the average primary particle diameter of not higher than 10, preferably of not higher than 3, or more preferably of not higher than 2 ensures the better recording quality of images on both the glossy medium and the non-glossy medium. Comparison between the measurement results of Examples 1B to 4B and that of Comparative Example 4B proves that the glass transition temperature of lower than 100° C., preferably of not higher than 30° C., or more preferably of not higher than 25° C. ensures the better recording quality of images on both the glossy medium and the non-glossy medium.

Each Disclosure of Japanese Patent Application No. 2004-146361 filed on May 17, 2004, Japanese Patent Applications No. 2004-146359 filed on May 17, 2004, and Japanese Patent Application No. 2005-139715 filed on May 12, 2005, each of which is including specification, drawings, and claims are incorporated herein by reference in their entirety.

What is claimed is:

1. An aqueous pigment ink composition, containing:
a pigment;
a water-dispersible polymer;
water; and
a water-soluble organic solvent,
wherein the pigment is dispersed as primary particles having an average primary particle diameter of not greater than 50 nm and as secondary particles having a ratio of an average secondary particle diameter to the average primary particle diameter in a range of 1 to 10, with the exception that the pigment is not present as only primary particles, and
the water-dispersible polymer has a minimum glass transition temperature of lower than 100° C.

2. An ink composition in accordance with claim 1, wherein the ratio of the average secondary particle diameter to the average primary particle diameter is not greater than 3.

3. An ink composition in accordance with claim 1, wherein the average secondary particle diameter of the pigment is not greater than 200 nm.

4. An ink composition in accordance with claim 1, wherein the minimum glass transition temperature of the water-dispersible polymer is not higher than 25° C.

5. An ink composition in accordance with claim 1, wherein the water-dispersible polymer is an acrylate-acrylic acid copolymer.

6. An ink composition in accordance with claim 1, wherein the pigment is coated with the water-dispersible polymer and is dispersed in the form of polymer-coated pigment.

7. An ink composition in accordance with claim 1, said ink composition containing the water-dispersible polymer in a range of 20 parts by weight to 200 parts by weight relative to 100 parts by weight of the pigment.

8. An ink composition in accordance with claim 1, said ink composition further containing either or both of (a) and (b):
(a) at least one of dialkyleneglycol monobutyl ethers and trialkyleneglycol monobutyl ethers, where the alkylene group contains 2 to 3 carbon atoms; and
(b) at least one of 1,2-alkanediols, where the alkane contains 5 to 8 carbon atoms.

9. An ink composition in accordance with claim 1, wherein the water-dispersible polymer is a copolymer having at least a hydrophilic group, which is mostly localized at a polymer end.

10. An ink composition in accordance with claim 9, wherein the water-dispersible polymer has a monomer unit, which includes a group selected from the group consisting of aromatic groups, cyclic aliphatic hydrocarbon groups of and over 5 carbon atoms, and chain aliphatic hydrocarbon groups of and over 8 carbon atoms, in a residual site other than the polymer end having the localized hydrophilic group.

11. An ink composition in accordance with claim 9, wherein the water-dispersible polymer is a copolymer prepared by copolymerization of a hydrophilic group-containing monomer with a prepolymer mainly composed of a monomer other than the hydrophilic group-containing monomer.

12. An ink composition in accordance with claim 11, wherein the hydrophilic group-containing monomer to be copolymerized with the prepolymer is not less than 80 mole percent of a total content of the hydrophilic group-containing monomer in the water-dispersible polymer.

13. An ink composition in accordance with claim 9, wherein the hydrophilic group is carboxyl group.

14. An ink composition in accordance with claim 9, wherein the water-dispersible polymer comprises (meth) acrylate-(meth)acrylic acid copolymer.

15. An ink composition in accordance with claim 1, said ink composition being prepared as inkjet recording ink.

16. A pigment dispersion for an aqueous pigment ink composition, said pigment dispersion having an aqueous phase, in which a water-dispersible polymer disperses a pigment as primary particles having an average primary particle diameter of not greater than 50 nm and as secondary particles having a ratio of an average secondary particle diameter to the average primary particle diameter in a range of 1 to 10.

17. A manufacturing method of an aqueous pigment ink composition, said manufacturing method comprising:
a pigment dispersion step of preparing a pigment dispersion having an aqueous phase, in which a water-dispersible polymer disperses a pigment as primary particles having an avenge primary particle diameter of not greater than 50 nm and as secondary particles having a ratio of an average secondary particle diameter to the average primary particle diameter in a range of 1 to 10 with the exception that the pigment is not present as only primary particles whereby the ratio is not 1; and
a composition preparation step of preparing the aqueous pigment ink composition from the pigment dispersion prepared in said pigment dispersion step.

18. A manufacturing method of an aqueous ink composition in accordance with claim 17, wherein said pigment dispersion step prepares a pigment dispersion, in which the water-dispersible polymer is a copolymer having at least a hydrophilic group, which is mostly localized at a polymer end.

19. An inkjet recording method, comprising the step of:
ejecting an aqueous pigment ink composition in accordance with claim 1 onto surface of a recording medium to form an inkjet recorded image.

20. An inkjet recording method, comprising the step of:
ejecting an aqueous pigment ink composition in accordance with claim 9 onto surface of a recording medium to form an inkjet recorded image.

21. A recorded matter, having an inkjet recorded image that is formed with an aqueous pigment ink composition in accordance with claim 1 on surface of a recording medium.

22. A recorded matter, having an inkjet recorded image that is formed with an aqueous pigment ink composition in accordance with claim 9 on surface of a recording medium.

23. An ink composition in accordance with claim 1, wherein the ratio of the average secondary particle diameter to the average primary particle diameter is in a range of 1.71 to 1.8.

24. An ink composition in accordance with claim 23, wherein the average primary particle diameter is between 35-50 nm and the average secondary particle diameter is between 60-90 nm.

* * * * *